Sept. 4, 1923.
R. R. BROWN ET AL
SHOCK ABSORBER
Filed March 5, 1921
1,467,090
2 Sheets-Sheet 1
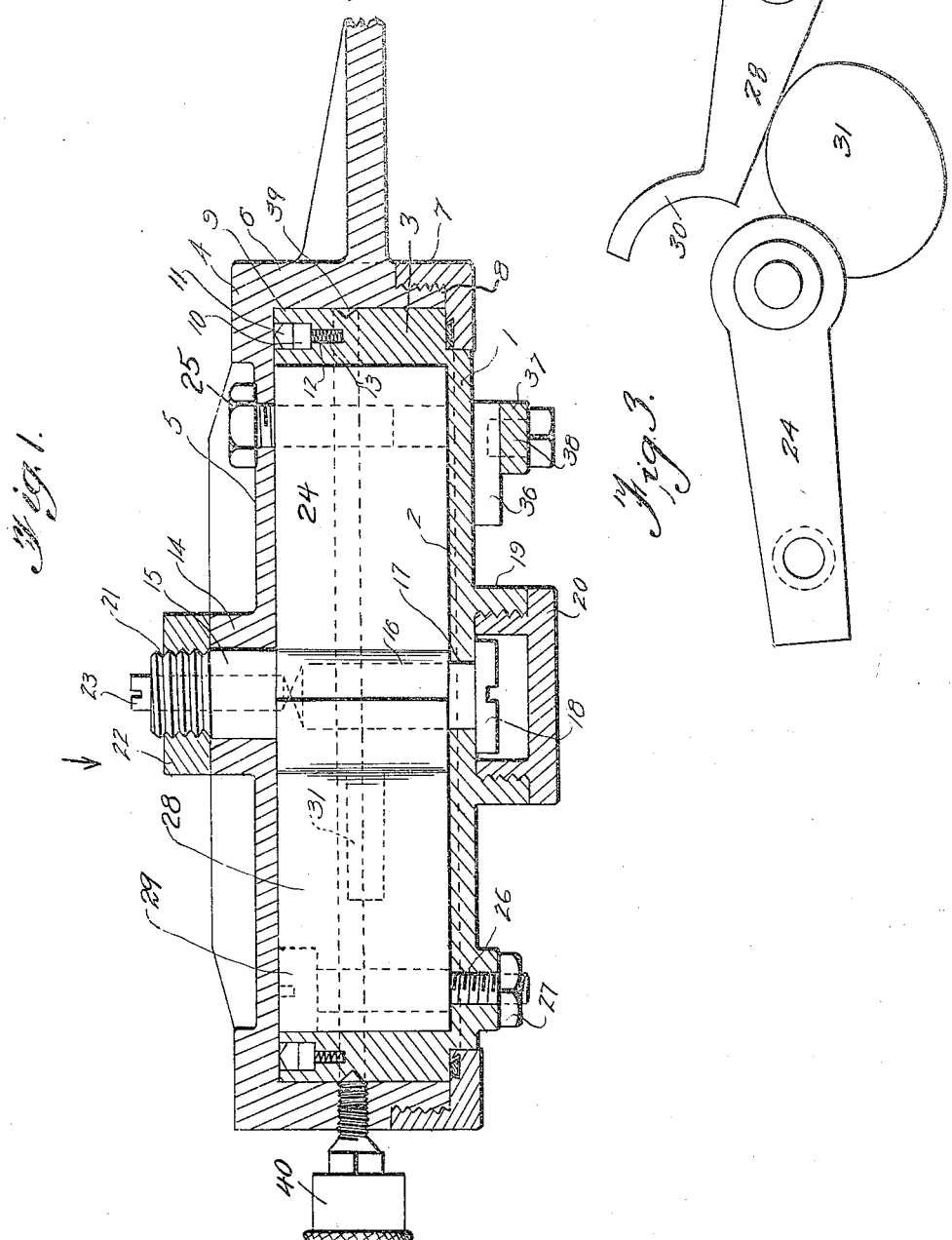
INVENTORS.
Robert R. Brown and George M. Peterson.
BY *F. P. Lorin*
ATTORNEY

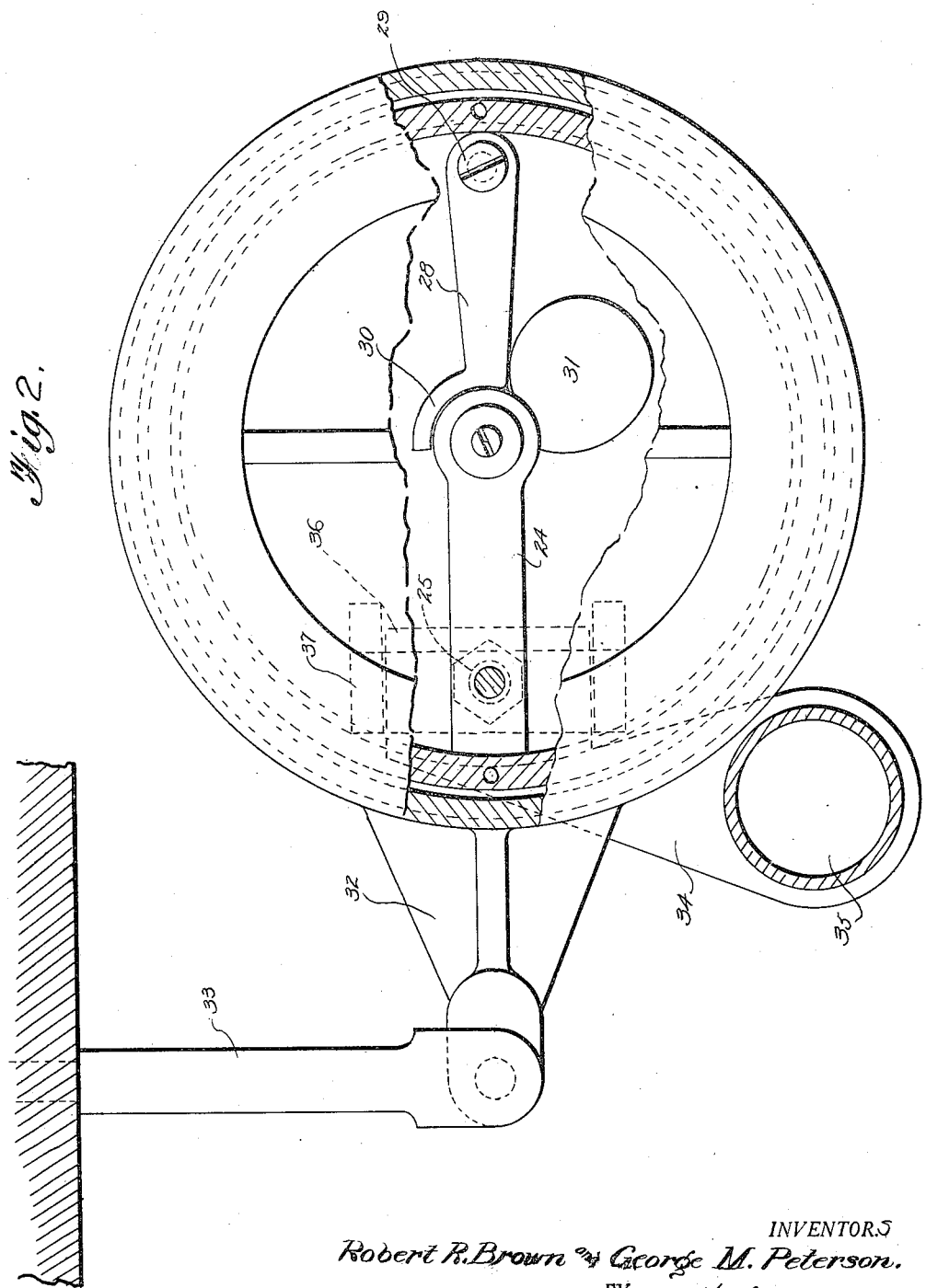

Patented Sept. 4, 1923.

1,467,090

UNITED STATES PATENT OFFICE.

ROBERT R. BROWN AND GEORGE M. PETERSON, OF SEATTLE, WASHINGTON.

SHOCK ABSORBER.

Application filed March 5, 1921. Serial No. 449,880.

*To all whom it may concern:*

Be it known that we, ROBERT R. BROWN and GEORGE M. PETERSON, citizens of the United States, and residing at Seattle, in the county of King and State of Washington, have invented certain new and useful Improvements in Shock Absorbers, of which the following is a specification.

This invention relates to an improvement in shock absorbers of the hydraulic type constructed to permit the ready attachment of the same to the vehicle and to retard movement in one direction by fluid strangulation.

In the drawings:—

Fig. 1 is a horizontal sectional view, partly in elevation of the improved shock absorber.

Fig. 2 is a broken side elevation of the same, looking in the direction of the arrow, Fig. 1.

Fig. 3 is an elevation illustrating more particularly the operation of the cut-off.

The improved shock absorber comprises a body member 1 including a face plate 2 and an annular wall 3. A similarly shaped member 4 including a face plate 5 and an annular wall 6 is arranged to fit over the member 1, the wall 6 closely embracing the wall 3 to thereby provide a hollow cylindrical-like body of comparatively short axial length. The free edge of the wall 6 is reduced and threaded to receive an L-shaped securing ring 7, one arm of which overlies the wall 3, preferably sitting in a recess 8 therein. The respective members 1 and 4 are therefore held against other than relatively rotary movement. The free edge of the wall 3 is recessed at 9 to receive an annular ring 10, adapted to underlie a sealing ring 11. Springs 12 seated in depressions 13 leading to the channel 9 force the ring 10 outwardly and thereby compel the free edge of the ring 11, which is preferably of double inclined form as shown to effect a sealing juncture with the inner surface of the face plate 5 of the member 4.

The face plate 5 of the member 4 is centrally formed with a projection 14 forming a bearing for a trunnion 15, which extends thru an opening in said face plate and bears against the face plate 2 of member 1. The trunnion is held with relation to the member 1 by a screw bolt 16 threaded into said trunnion from below and thru an opening 17 in the face plate 2, the head 18 of the screw bolt 16 bearing upon the outer surface of the face plate 2 within an annular wall projection 19, a cap 20 engaging said wall projection to seal the juncture. The trunnion 15 extends beyond the wall extension 14 as a threaded member 21 to be engaged by a nut 22, and a lock screw 23 is threaded longitudinally of the trunnion to cooperate with the screw bolt 16 to hold the parts. A gate 24 is rotatably supported upon the trunnion 15 within the casing provided by the members 1 and 4, this gate extending to the wall 3 and being secured to the member 4 by a bolt 25, threaded thru face plate 5 and seating in an aperture in gate 24. A cut-off 28 is pivotally supported at its outer end by a bolt 29, which extends thru the cut-off, and is threaded thru an opening 26 in face plate 2 of member 1, being secured by nut 27. The gate 24 and the cut-off 28 are opposed, as shown, and the inner end of the cut-off has a wing projection 30 adapted to bear upon and conform to the shape of the sleeve element of the gate 24 which surrounds the trunnion 15. The wing 30 has a lineal dimension somewhat less than one-half the circumference of the member against which it bears. A cam member 31 is secured upon the gate 24, preferably on the sleeve mounting of such gate and so positioned that when the cut-off wing 30 rests against the sleeve member, the cam 31 just engages the cut-off. Cam 31 is of materially less thickness than the axial length of the interior of the casing, as will be plain from Fig. 2 of the drawings. A bracket 32 extends from the wall 6 of the member 4, and is preferably provided with a movably connected upright 33, which may be rigidly attached in any manner to the chassis of a vehicle. A bracket 34 formed at 35 to embrace the axle or axle housing of the vehicle has a lateral extension 36, which seats in a recess formed by suitably off-setting a bar 37 from the face plate 2 of the member 1. Set screws 38 extend thru the off-set bar and engage the extension 36. The members 1 and 4 are thus connected to separate portions of the vehicle adapted for relative movement in the play of the body during travel. If, as is contemplated, the interior of the casing be filled with a substantially non-compressible fluid, such as oil, it will be apparent that in the relative rotation of the members forming the casing in one direction, the cam 31 will engage and move the cut-off 28 so as to provide an opening between the wing 30 thereof and the sleeve mounting of the gate 24. As of course the gate and cut-off move relative to each other, the gate will tend to force the oil ahead of it and thru the opening afforded by the opening of the cut-off thru action of the cam 31. In the reverse movement however, which is the return movement of the parts toward normal, the gate acting in the opposite direction, tends to move the body of the oil in such direction. However, the closing of the cut-off, or the movement of such cut-off toward closing position tends to reduce the passage and thereby the oil, not permitted a free flow, resists the movement of the gate and so absorbs the shock.

The wall 3 of member 1 is formed with a circumferential lubricating channel 39, to which lubricant may be fed from a grease-cup 40 mounted in the wall 6 of member 4.

Claims:

1. A shock absorber including a hollow casing adapted to contain a body of non-compressible liquid, a gate operated in said casing to move the body of liquid, a cut-off to control the movement of such body of liquid, said cut-off having a part adapted to cooperate with the gate to provide a fluid passage between said cut-off and gate in the movement of the cut-off, and means on the gate to control the movement of the cut-off.

2. A shock absorber including a hollow casing adapted to contain a body of non-compressible liquid, a gate operated in said casing to move the body of liquid, a cut-off to control the movement of such body of liquid, said cut-off having a part adapted to cooperate with the gate to provide a fluid passage between said cut-off and gate in the movement of the cut-off, and a cam on the gate to control the movement of the cut-off.

3. A shock absorber comprising a casing made up of relatively movable members cooperating to form a hollow body, a center trunnion in said body, a gate rotatably mounted on the trunnion and fixed at its outer end to one of the members, a cut-off fixed at its outer end to the other of said members and having a wing extension to bear on the gate, and a cam carried by the gate to operate the cut-off in the movement of the gate in one direction.

4. In a shock absorber, interfitting cup-like members arranged for relative rotative movement, a gate rotatively supported on the axial line of said members and secured to one of the members remote from said axial line, a cut-off secured to the other of said members remote from the axial line and having a part to normally bear upon said gate, and a member carried by the gate and adapted to normally engage the cut-off, whereby in movement of the gate in one direction incident to the relative rotary movement of said cup-like members said member will engage the cut-off and move the same to provide an opening between the gate and cut-off.

5. A shock absorber, comprising independend cup-like members connected for relative rotation and to provide a closed liquid reservoir, two members arranged in said reservoir and normally dividing the same into opposed normally non-communicating chambers, said members being respectively connected to different cup-like members, and means whereby in the relative movement of the cup-like members one of said division members operates the other of said members to provide a channel of communication between said chambers.

6. A shock absorber, comprising independent cup-like members connected for relative rotary movement and providing a closed liquid reservoir, division members connected to the respective cup-like members and normally dividing said reservoir into independent non-communicating chambers, one of said division members having a rounded wall at the central portion of said reservoir and the other of said members having an extension to normally bear upon and fit said rounded wall for a portion of its circumference, and means on one of said division members to compel a relative movement of said members to space the extension portion from said rounded wall in the relative movement of the cup-like members, whereby to provide a means of communication between said chambers.

In testimony whereof we affix our signatures.

ROBERT R. BROWN.
GEORGE M. PETERSON.